April 29, 1924.
J. D. PRINCE
1,492,218
INNER TUBE FOR PNEUMATIC TIRES
Filed June 9, 1921
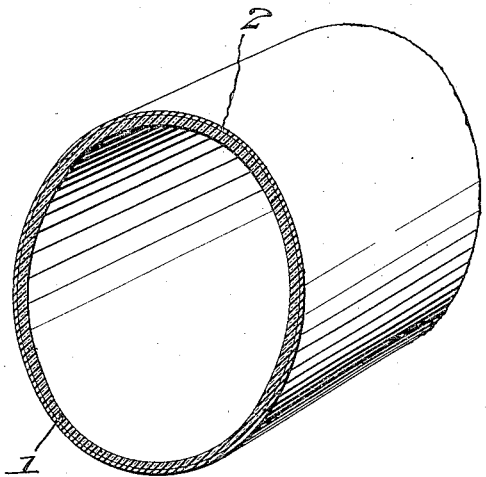
Inventor:-
John D. Prince
by his attorney Patented Apr. 29, 1924.

1,492,218

UNITED STATES PATENT OFFICE.

JOHN D. PRINCE, OF BOSTON, MASSACHUSETTS.

INNER TUBE FOR PNEUMATIC TIRES.

Application filed June 9, 1921. Serial No. 476,262.

*To all whom it may concern:*

Be it known that I, JOHN D. PRINCE, a citizen of the United States, and resident of Boston, in the county of Suffolk and State of Massachusetts, have invented a new and useful Improvement in Inner Tubes for Pneumatic Tires, of which the following is a specification.

This invention relates to an improvement in inner tubes for pneumatic tires and has for its object to produce an article of this nature which is well adapted to satisfy in a high degree all the requirements to which such a tube is subjected in use.

Various other objects and points of advantage will be detailed in the following specification.

Broadly considered the invention comprehends a tube which is composed of two layers of rubber compound having different characteristics, which cooperate, as a unit, to attain the desirable results herein mentioned.

A practical embodiment of the invention is represented in the accompanying drawing which shows a detail perspective view of a portion of a tube constructed as hereinafter described.

As already indicated, the tube is composed of two layers of rubber compound, the inner layer being denoted by 1, and the outer layer by 2.

The inner layer is composed of a comparatively tough, stiff and inelastic composition, which has very good aging qualities and also a tendency toward a permanent set. By the word set I mean a characteristic of the compound whereby, upon being stretched or distorted, it will tend to remain at least partially so stretched or distorted.

This inner layer 1 is preferably black in color and may consist of various different compounds suitably mixed and vulcanized, but it is essential that it contain as an ingredient a wax, such as Montan or Montan-sub, or the equivalent thereof.

For the purpose of definiteness, I may give a specific formula, but this must be understood as being for the purpose of illustration only.

Smoked sheet (crude rubber) ......... 59%
Montan wax .......................... 8%
Carbon black ......................... 24%
Magnesia oxide ....................... 4%
Litharge ............................. 3%
Sulfur ............................... 2%

These ingredients may be compounded for vulcanization in the manner ordinarily followed in the rubber industry, and the compound can be properly vulcanized in fifty minutes at forty-five pounds steam pressure.

The outside layer 2 is composed of a more elastic composition and is also preferably of a different color from the inner layer. The color which I have selected for this outer layer as being best suited to the purpose is red, although other colors, such as gray, may be employed, the point being to have a color which is of a commercial shade and also distinct from the color of the inner layer 1.

I have found that the following compound, which is given by way of illustration, is suitable for this layer:

Pale crêpe (crude rubber) ............ 68%
Montan wax ........................... 3%
Magnesia oxide ....................... 3%
Paraffine wax ........................ 1%
Golden antimony ...................... 23%
Sulfur ............................... 2%

This compound will vulcanize properly when subjected to the same conditions as the specific formula for the black layer 1 already given.

I prefer that this tube shall be built so that the inner or rim portion of the black layer 1 shall be thinner than the remainder of the same, in order that the greater proportion of stretch which takes place upon inflation may occur at the rim portion as distinguished from the outer portion of the tube. The reason for this is that the less the outer portion is stretched the more resistive it will be to puncture. This feature works well in combination with the relatively tough nature of the black layer to prevent injury to the tube which would result in deflation.

In manufacturing this tube, suitable compounds for the inner and outer layers are prepared in the customary manner and rolled out into sheets, preferably about one-thirty-second of an inch in thickness. The red sheet is then wound upon the usual pole mandrel, in the ordinary manner, it being understood that the said sheet is of sufficient length to provide the desired thickness for the red layer to be incorporated in the tube. Following this the black layer is similarly wound on top of the red layer until the desired thickness of the black layer is obtained. When the last wind of the black sheet is reached, it is discontinued after going about three-fourths of the way around the pole so as to leave the other one-fourth substantially one-thirty-second of an inch thinner than the remainder of the black layer. This one-fourth portion is designed to constitute the rim portion which, as already mentioned, is to be thinner than the remainder of the black layer. It is intended that the black layer shall be much thicker than the red, as it imparts the strength to the tube.

The next step is to wrap the tube with muslin and vulcanize or cure the same, all in the customary manner. After the vulcanizing has been completed, the tube is unwrapped, removed from the mandrel, inverted, its ends spliced, and the valve inserted; all this being done in the well known and usual manner.

This inverting of the tube will leave the red layer on the outside because it was wound on the mandrel first. In case it is desired to employ any color other than red, it is only necessary to change the color pigment incorporated in the formula given for the red layer.

As a result of this arrangement I have a tube, the main strength of which resides in the thick inner black layer composed of the relatively tough, stiff and inelastic material, with its tendency to a permanent set. This layer is calculated to have the greater portion of its stretch, when inflated, take place at the rim portion in order that the outer portion may not be thinned by reason of stretching. Furthermore, the tendency to set will cause the tube to more or less retain its enlarged form, after inflation, so as not to rapidly contract and expand as a result of obstructions which the outer casing of the tire may encounter when in use. Such rapid contraction and expansion tends to injure the casing by inducing a corresponding flexion of its fabric body portion. This characteristic of my improved tube thus serves to alleviate to a large extent this prevalent source of injury to the casing.

The red (or other suitably colored) layer serves as a protective covering for the black, since it is more resistive to injury arising from exposure to weather conditions. It is a fact that, among other factors which tend to injure vulcanized rubber compounds, the so-called "violet ray" actually affects rubber in the same manner as a vulcanizing agent, and therefore tends to injure it just as though it has been originally over vulcanized. The red, (or other suitably colored) layer protects the black layer 1 from this ray as well as from moisture, gases, etc.

Furthermore, the said layer 2, being relatively thin and of a different color from the layer 1, enables the user to observe when the tube has been chafed, because the black will show through the red. Thus it serves the purpose of a warning. Again, black is not a desirable commercial color for a tube, and yet I have found it a highly desirable color to be used in the compound of the inner layer 1, which contains the Montan wax or its equivalent. Aside from the points already mentioned, the fact that the outer layer 2 is of greater elasticity than the black layer 1 prevents it from handicapping the latter in its normal action already described, since it will yield in any direction required by the action of the black layer. In other words, I believe that, as a result of the composition and arrangement of the two layers, I am enabled to properly control the elastic action of the rubber which forms the tube so as to obtain that efficiency which is the object of this invention.

It may further be remarked that this tube will not crack when folded and it will readily stay in compact folds for the purpose of transportation. Furthermore, it is readily inserted in the tire casing because of its stiffness, and will conform to the casing without the formation of folds or creases.

I desire it to be understood that various changes may be resorted to in the ingredients, percentages, methods of mixing, molding and vulcanizing, and in the thicknesses of the layers without departing from the spirit and scope of my invention; and that I do not intend to be limited to the details herein set forth except as the same may be specifically included in the claims.

What I claim is:

1. An inner tube composed of a plurality of layers, the inner layer being composed of a relatively stiff and inelastic composition having a tendency to a permanent set.

2. An inner tube composed of a plurality of layers, the inner layer being relatively thick and being composed of a relatively stiff and inelastic composition having a tendency to a permanent set.

3. An inner tube composed of a plurality of layers, the inner layer being relatively thick and being composed of a relatively stiff and inelastic composition having a tendency to a permanent set, said inner layer also being thinner at the rim portion than at the outer portion.

4. An inner tube composed of a plurality of layers, one of said layers consisting of a composition including a wax of the Montan class.

5. An inner tube composed of a plurality of layers, the inner layer consisting of a composition including a wax of the Montan class.

6. An inner tube composed of a plurality of layers, one of said layers consisting of a composition including a wax of the Montan class, said layer being relatively thick and of a relatively stiff and inelastic nature having a tendency to a permanent set.

7. An inner tube composed of a plurality of layers, the inner layer consisting of a composition including a wax of the Montan class, said layer being relatively thick and of a relatively stiff and inelastic nature having a tendency to a permanent set.

8. An inner tube composed of a plurality of layers, the inner layer consisting of a composition including a wax of the Montan class, said layer being relatively thick and its rim portion being thinner than its outer portion, said layer also having a relatively stiff and inelastic nature with a tendency to a permanent set, and the outer layer being relatively thin and consisting of a composition having a relatively yielding and elastic nature, said outer layer being of a different color from said inner layer and serving as a protective covering therefor.

In testimony, that I claim the foregoing as my invention, I have signed my name this 7th day of June, 1921.

JOHN D. PRINCE.